2,801,987
COLOR STABILIZATION OF ACRYLONITRILE POLYMERS

James Herman Fortune, Springdale, Conn., assignor to American Cyanamid Company, New York, N. Y., a corporation of Maine No Drawing. Application May 18, 1953, Serial No. 355,871

19 Claims. (Cl. 260—45.75)

This invention relates to the stabilization of polymers of acrylonitrile and its derivatives. More particularly, this invention relates to the color stabilization of polymers containing at least 10% acrylonitrile and its derivatives and correspondingly 90% of another polymerizable compound polymerized therewith.

Polymers containing acrylonitrile and its derivatives are desired due to the fact that acrylonitrile imparts to said polymers increased heat resistance, chemical resistance, abrasion resistance and flexural strength. However, when heated to elevated temperatures, the acrylonitrile and its derivatives present in the polymer has a tendency to discolor the normally water-clear polymer.

It is therefore an object of this invention to color stabilize polymers containing acrylonitrile and its derivatives. It is a further object of this invention to add to the polymeric material a small amount of a color stabilizer. These and other objects of my invention will be discussed more fully hereinbelow.

The polymers that may be stabilized in accordance with my invention include copolymers and/or interpolymers of acrylonitrile and its derivatives with another polymerizable compound containing a polymerizable $CH_2=C<$ grouping. The acrylonitrile derivatives included in the definition of my process are the alkyl substituted compounds wherein the alkyl group contains from 1 to 4 carbon atoms. Examples of such compounds are methacrylonitrile, ethacrylonitrile, propacrylonitrile, butacrylonitrile, and the like. Included within the process definition as polymerizable compounds which may be polymerized with the acrylonitrile and its derivatives and rendered color-stabilized are those containing one $CH_2=C<$ grouping and having a boiling point of at least 60° C. Examples of such compounds are styrene, nuclear-substituted alkyl styrenes, e. g., o, m, and p-methyl styrene, 2,4-dimethyl styrene, 2,4-diethyl styrene, and the like; nuclear-substituted halo styrenes, e. g., 2,4-dichlorostyrene, 2,5-dichlorostyrene, chlorostyrene, and the like; the side-chain alkyl and halo substituted styrenes, e. g., 2-chlorostyrene, 2-methylstyrene and the like. Vinyl compounds that may be mentioned are acrylic acid, allyl chloride, methallyl alcohol, methyl vinyl ketone, propyl vinyl ketone, phenyl vinyl ketone, allyl ether, and the like. Also included in the process definition are alkyl esters of acrylic and methacrylic acids, e. g., ethyl acrylate, methyl methacrylate and the like; esters of unsaturated alcohols with saturated acids, e. g., vinyl acetate, vinyl propionate, vinyl stearate and the like. It is to be understood that the polymers may be copolymers and/or interpolymers containing mixtures of acrylonitrile and its derivatives with polymerizable compounds set forth above. The preferred amount of acrylonitrile and its derivatives present in the polymers may vary from 10% to 70% by weight.

The color stabilization of the polymeric compositions of my invention is effected by dispersing into said compositions a small amount of a color stabilizer selected from the group consisting of (1) zinc phenyl dithiocarbamate, (2) a compound represented by the general formula

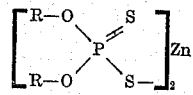

in which R is a member of the group consisting of aryl, alkyl, aralkyl, and cycloalkyl radicals, and (3) a compound represented by the general formula

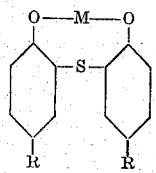

wherein M is an alkali earth metal selected from the group consisting of barium and calcium and R is an alkyl radical having from 1 to 20 carbon atoms. Compounds of the class represented by the general formula set forth in (2) include the dialkyl dithiophosphates such as dimethyl dithiophosphate, dibutyl dithiophosphate, dihexyl dithiophosphate, and the like. I prefer to use those dialkyl dithiophosphates in which the alkyl group has from 1 to 8 carbon atoms. Diaralkyl dithiophosphate and diaryl dithiophosphates in which the aryl group bears an alkyl, alkoxy or cycloaliphatic group are also useful in my invention, examples of which are diphenyl dithiophosphate, di-(2,4-diethyl phenyl) dithiophosphate, and the like. The alkyl group in the aralkyl radical should also have from 1 to 8 carbon atoms. I may also use dicycloaliphatic dithiophosphates such as are prepared by reacting cyclopentanol, cyclohexanol, methyl, ethyl, and propyl substituted cyclopentanol and cyclohexanol, etc., with $P_2S_5$. Examples of compounds represented by the general formula (3) set forth above are barium octyl phenol sulfide, calcium octyl phenol sulfide, barium butyl phenol sulfide, barium amyl phenol sulfide, calcium methyl phenol sulfide, calcium dodecyl phenol sulfide, etc. The amount of color stabilizer that is added to the polymers may vary from 0.001% to 5% based on the total weight of the polymers. However, it is preferred that from 0.05% to 0.1% by weight based on the total weight be employed.

The color stabilizer may be incorporated into the polymer in any of several methods. If desired, the stabilizer and the solid polymer may be mixed as, for example, on a two roll mill or by any other suitable mixing machine adapted to blend solid plastic material. Alternatively, the stabilizer may be added to the monomers in the polymerization recipe when the polymerization is carried out as, for instance in an aqueous emulsion. Any method that permits a uniform distribution of the color stabilizer throughout the polymer may also find use in my invention.

The polymers that have been color stabilized according to my invention may find use in the preparation of films, molded or extruded objects wherein a transparent or light-colored article is desired.

In order that those skilled in the art may more fully understand the inventive concept herein employed, the following table is set forth disclosing a polymer stabilized in accordance with my invention:

| Polymer, Weight Ratio | Stabilizer | Amount | | Color Rating [3] | |
|---|---|---|---|---|---|
| | | Percent Based on Polymer | As Polymerized | After 1 hr. at 190° C. | After 1 hr. at 210-220° C. |
| 70/30 S/AN [1] | None | | 2 | 8 | 10 |
| 70/30 S/AN | Zinc Phenyl Dithiocarbamate | 0.10 | 3 | 4 | 7 |
| 70/30 S/AN | ...do... | 0.03 | 3 | 7 | |
| 70/30 DMS/AN [2] | None | | | 10 | |
| 70/30 DMS/AN | Zinc Phenyl Dithiocarbamate | 0.10 | | 6 | |
| 70/30 S/AN | Calcium Octyl Phenol Sulfide | 0.10 | 2 | 6 | 8 |
| 70/30 S/AN | Barium Octyl Phenol Sulfide | 0.10 | 2 | 6 | 8 |
| 70/30 S/AN | Zinc Dimethyl Dithiophosphate | 0.10 | 2 | 6 | |
| 70/30 S/AN | Zinc Dihexyl Dithiophosphate | 0.10 | 3 | 4 | 7 |

[1] Styrene/acrylonitrile.
[2] Dimethyl styrene/acrylonitrile.
[3] Color rating:
  1—Water White.
  4—Very Light Yellow.
  7—Light Yellow.
  10—Amber.
  14—Black.

I claim:
1. A resinous composition having increased color stability which comprises the polymerization product of from about 10% to about 70% by weight of a compound selected from the group consisting of acrylonitrile and alkyl substituted acrylonitrile wherein the alkly group contains from 1 to 4 carbon atoms and from about 90% to about 30% by weight of a compound selected from the group consisting of styrene, nuclear substituted methyl styrene, nuclear substituted dimethyl styrene, nuclear substituted ethyl styrene, nuclear substituted diethyl styrene, nuclear substituted chloro styrene and nuclear substituted dichloro styrene, and dispersed therein from about 0.005% to about 5% by weight based on the total weight of a color stabilizer selected from the group consisting of zinc phenyl dithiocarbamate, a compound represented by the general formula

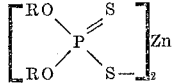

wherein R represents a substituent selected from the group consisting of alkyl, aryl, aralkyl and cycloalkyl radicals and a compound represented by the general formula

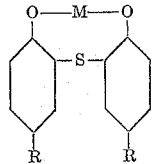

wherein M represents an alkali earth metal selected from the group consisting of barium and calcium and R represents an alkyl radical containing from 1 to 20 carbon atoms.

2. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methyl styrene, nuclear substituted dimethyl styrene, nuclear substituted ethyl styrene, nuclear substituted diethyl styrene, nuclear substituted chloro styrene and nuclear substituted dichloro styrene, and dispersed therein from about 0.005% to about 5% by weight based on the total weight of the color stabilizer zinc phenyl dithiocarbamate.

3. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methyl styrene, nuclear substituted dimethyl styrene, nuclear substituted ethyl styrene, nuclear substituted diethyl styrene, nuclear substituted chloro styrene and nuclear substituted dichloro styrene, and dispersed therein from about 0.005% to about 5% by weight based on the total weight of a color stabilizer represented by the general formula

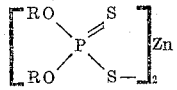

wherein R represents a substituent selected from the group consisting of alkyl, aryl, aralkyl and cycloalkyl radicals.

4. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methyl styrene, nuclear substituted dimethyl styrene, nuclear substituted ethyl styrene, nuclear substituted diethyl styrene, nuclear substituted chloro styrene and nuclear substituted dichloro styrene, and dispersed therein from about 0.005% to about 5% by weight based on the total weight of a color stabilizer represented by the general formula

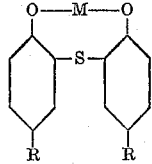

wherein M represents an alkali metal selected from the group consisting of barium and calcium and R represents an alkyl radical containing from 1 to 20 carbon atoms.

5. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methyl styrene, nuclear substituted dimethyl styrene, nuclear substituted ethyl styrene, nuclear substituted diethyl styrene, nuclear substituted chloro styrene and nuclear substituted dichloro styrene, and dispersed therein from about 0.005% to about 5% by weight based on the total weight of the color stabilizer zinc dihexyl dithiophosphate.

6. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methyl styrene, nuclear substituted dimethyl styrene, nuclear substituted ethyl styrene, nuclear substituted diethyl styrene, nuclear substituted chloro styrene and nuclear substituted dichloro styrene, and dispersed therein from about 0.005% to about 5% by weight based on the total weight of the color stabilizer zinc dimethyl dithiophosphate.

7. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methyl styrene, nuclear substituted dimethyl styrene, nuclear substituted ethyl styrene, nuclear substituted diethyl styrene, nuclear substituted chloro styrene and nuclear substituted dichloro styrene, and dispersed therein from about 0.005% to about 5% by weight based on the total weight of the color stabilizer barium octyl phenol sulfide.

8. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of a compound selected from the group consisting of styrene, nuclear substituted methyl styrene, nuclear substituted dimethyl styrene, nuclear substituted ethyl styrene, nuclear substituted diethyl styrene, nuclear substituted chloro styrene and nuclear substituted dichloro styrene, and dispersed therein from about 0.005% to about 5% by weight based on the total weight of the color stabilizer calcium octyl phenol sulfide.

9. A resinous composition having increased color stability which comprises the polymerization product of from 10% to about 70% by weight of a compound selected from the group consisting of acrylonitrile and alkyl substituted acrylonitrile wherein the alkyl group contains from 1 to 4 carbon atoms and from about 90% to about 30% by weight of styrene, and dispersed therein from about 0.005% to about 5% by weight based on the total weight of a color stabilizer selected from the group consisting of zinc phenyl dithiocarbamate, a compound represented by the general formula

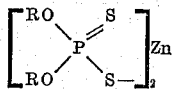

wherein R represents a substituent selected from the group consisting of alkyl, aryl, aralkyl and cycloalkyl radicals and a compound represented by the general formula

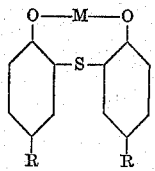

wherein M represents an alkali earth metal selected from the group consisting of barium and calcium and R represents an alkyl radical containing from 1 to 20 carbon atoms.

10. A resinous composition having increased color stability which comprises the polymerization product of from about 10% to about 70% by weight of acrylonitrile and from about 90% to about 30% by weight of styrene, and dispersed therein from about 0.005% to about 5% by weight based on the total weight of a color stabilizer selected from the group consisting of zinc phenyl dithiocarbamate, a compound represented by the general formula

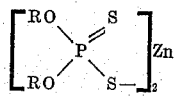

wherein R represents a substituent selected from the group consisting of alkyl, aryl, aralkyl and cycloalkyl radicals and a compound represented by the general formula

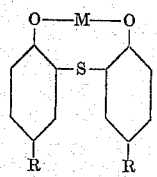

wherein M represents an alkali earth metal selected from the group consisting of barium and calcium and R represents an alkyl radical containing from 1 to 20 carbon atoms.

11. A resinous composition having increased color stability which comprises the polymerization product of from about 10% to about 70% by weight of acrylonitrile and from about 90% to about 30% by weight of styrene, and dispersed therein from about 0.005% to about 5% by weight based on the total weight of the color stabilizer zinc phenyl dithiocarbamate.

12. A resinous composition having increased color stability which comprises the polymerization product of from about 10% to about 70% by weight of acrylonitrile and from about 90% to about 30% by weight of styrene, and dispersed therein from about 0.005% to about 5% by weight based on the total weight of a color stabilizer represented by the general formula

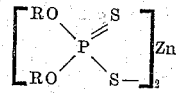

wherein R represents a substituent selected from the group consisting of alkyl, aryl, aralkyl and cycloalkyl radicals.

13. A resinous composition having increased color stability which comprises the polymerization product of from about 10% to about 70% by weight of acrylonitrile and from about 90% to about 30% by weight of styrene, and dispersed therein from about 0.005% to about 5% by weight based on the total weight of a color stabilizer represented by the general formula

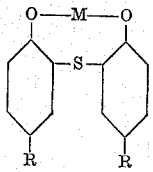

wherein M represented an alkali earth metal selected from the group consisting of barium and calcium and R represents an alkyl radical containing from 1 to 20 carbon atoms.

14. A resinous composition having increased color stability which comprises the polymerization product of from about 10% to about 70% by weight of acrylonitrile and from about 90% to about 30% by weight of styrene, and dispersed therein from about 0.005% to about 5% by weight based on the total weight of the color stabilizer zinc dihexyl dithiophosphate.

15. A resinous composition having increased color stability which comprises the polymerization product of from about 10% to about 70% by weight of acrylonitrile and from about 90% to about 30% by weight of styrene, and dispersed therein from about 0.005% to about 5% by weight based on the total weight of the color stabilizer zinc dimethyl dithiophosphate.

16. A resinous composition having increased color stability which comprises the polymerization product of from about 10% to about 70% by weight of acrylonitrile and from about 90% to about 30% by weight of styrene, and dispersed therein from about 0.005% to about 5% by weight based on the total weight of the color stabilizer barium octyl phenol sulfide.

17. A resinous composition having increased color stability which comprises the polymerization product of from about 10% to about 70% by weight of acrylonitrile and from about 90% to about 30% by weight of styrene, and dispersed therein from about 0.005% to about 5% by weight based on the total weight of the color stabilizer calcium octyl phenol sulfide.

18. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of nuclear substituted methyl styrene, and dispersed therein from about 0.005% to about 5% by weight based on the total weight of a color stabilizer selected from the group consisting of zinc phenyl dithiocarbamate, a compound represented by the general formula

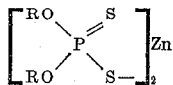

wherein R represents a substituent selected from the group consisting of alkyl, aryl, aralkyl and cycloalkyl radicals and a compound represented by the general formula

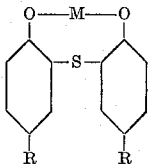

wherein M represents an alkali earth metal selected from the group consisting of barium and calcium and R represents an alkyl radical containing from 1 to 20 carbon atoms.

19. A resinous composition having increased color stability which comprises the polymerization product of from about 10% to about 70% by weight of a compound selected from the group consisting of acrylonitrile and alkyl substituted acrylonitrile wherein the alkyl group contains from 1 to 4 carbon atoms and from about 90% to about 30% by weight of nuclear substituted dimethyl styrene, and dispersed therein from about 0.005% to about 5% by weight based on the total weight of a color stabilizer selected from the group consisting of zinc phenyl dithiocarbamate, a compound represented by the general formula

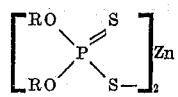

wherein R represents a substituent selected from the group consisting of alkyl, aryl, aralkyl and cycloalkyl radicals and a compound represented by the general formula

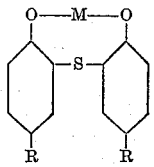

wherein M represents an alkali earth metal selected from the group consisting of barium and calcium and R represents an alkyl radical containing from 1 to 20 carbon atoms.

References Cited in the file of this patent
UNITED STATES PATENTS 2,310,449   Lightbown et al. _____ Feb. 9, 1943